United States Patent
Lin et al.

(10) Patent No.: US 9,442,634 B2
(45) Date of Patent: Sep. 13, 2016

(54) LOCALIZATION SYSTEM FOR MOUNTING GAME IN PORTABLE STORAGE DEVICE ON GAME CONSOLE AND METHOD THEREFOR

(71) Applicant: Pao-Chen Lin, Hsinchu County (TW)

(72) Inventors: Pao-Chen Lin, Hsinchu County (TW); Hung-Chun Tseng, Yunlin County (TW)

(73) Assignee: Pao-Chen Lin, Hsinchu County (TW)

( * ) Notice: Subject to any disclaimer, the term of this patent is extended or adjusted under 35 U.S.C. 154(b) by 0 days.

(21) Appl. No.: 14/860,667

(22) Filed: Sep. 21, 2015

(65) Prior Publication Data

US 2016/0018956 A1    Jan. 21, 2016

Related U.S. Application Data

(63) Continuation of application No. 14/289,668, filed on May 29, 2014, now Pat. No. 9,162,141, which is a continuation-in-part of application No. 13/684,177, filed on Nov. 22, 2012, now Pat. No. 9,205,323.

(51) Int. Cl.
| | |
|---|---|
| *A63F 13/00* | (2014.01) |
| *G06F 3/0482* | (2013.01) |
| *A63F 13/98* | (2014.01) |
| *A63F 13/90* | (2014.01) |
| *A63F 13/40* | (2014.01) |
| *A63F 13/77* | (2014.01) |
| *A63F 13/95* | (2014.01) |
| *G06F 17/30* | (2006.01) |
| *H04L 29/08* | (2006.01) |

(52) U.S. Cl.
CPC ............. *G06F 3/0482* (2013.01); *A63F 13/02* (2013.01); *A63F 13/08* (2013.01); *A63F 13/10* (2013.01); *A63F 13/77* (2014.09); *A63F 13/95* (2014.09); *G06F 17/30994* (2013.01); *H04L 67/06* (2013.01); *A63F 2300/206* (2013.01); *A63F 2300/207* (2013.01); *A63F 2300/209* (2013.01)

(58) Field of Classification Search
CPC ........ A63F 13/02; A63F 13/00; A63F 13/10; A63F 2300/209; A63F 2300/206
See application file for complete search history.

(56) References Cited

U.S. PATENT DOCUMENTS

| | | |
|---|---|---|
| 2009/0115900 A1 | 5/2009 | Dai |
| 2013/0029745 A1 | 1/2013 | Kelly |

*Primary Examiner* — Reginald Renwick
(74) *Attorney, Agent, or Firm* — Winston Hsu; Scott Margo

(57) ABSTRACT

A localization system for mounting a game includes at least a portable storage device, wherein each portable storage device comprising a target word unit, linked to small database having an identification code, wherein small database accesses a logic allocation unit comprising at least one file and each file comprises a file identification code; and a game console, comprising at least an interface, linked to a storage unit storing at least an application program for linking portable storage device and for downloading or overwriting existing file; and a central process unit; wherein the application program is utilized to access small database and display relevant information about file having file identification code corresponding to identification code of small database; wherein when game is selected to be executed, central process unit loads file of game into a free space in a main memory of game console and executes file of game.

17 Claims, 16 Drawing Sheets

LOCALIZATION SYSTEM FOR MOUNTING GAME IN PORTABLE STORAGE DEVICE ON GAME CONSOLE AND METHOD THEREFOR

CROSS REFERENCE TO RELATED APPLICATIONS

This application is a continuation application of application Ser. No. 14/289,668, filed May 29, 2014, which is a continuation-in-part application of application Ser. No. 13/684,177, filed Nov. 22, 2012, which is incorporated herein by reference for all purposes.

BACKGROUND OF THE INVENTION

1. Field of the Invention

The invention relates to a localization technology of mounting a game, in a portable storage device, on a game console, and more particularly, to a localization system for mounting a game, in a portable storage device, on a game console and a method therefor, capable of promptly mounting a game on the game console without installation and of saving time of file transfer to an internal hard disk of the game console.

2. Description of the Prior Art

A conventional game console usually requires the mounting of the game programs stored in an external portable storage device into an internal hard disk before activating them. When there are a large number of game programs in the portable storage device, mounting these game programs would take a significant amount of time. The limited space in the internal hard disks allows only a limited number of game programs. The internal hard disk also leads to the bulky size of the game device and its poor portability and high cost.

SUMMARY OF THE INVENTION

A major objective of the present invention is to promptly mount a game using an asynchronous localization technology to simulate a portable storage device as an internal hard disk in a game console, thereby enhancing the game console's effectiveness. Additionally, the game console has a reduced dimension and can have a game promptly mounted thereon without any hard disk.

In order to achieve the objective of the present invention, a game console and a portable storage device data-linked with the game console are provided. The portable storage device comprises a target (i.e. a target word unit) data-linked with a header (i.e. a small database) having an identification code, capable of reading a logic allocation unit containing at least a file, where the file has a game identification code corresponding to the identification code in the header and thus can be precisely located and accessed by the small database (i.e. header). The game console is data-linked with the portable storage device through at least an interface which is data-linked with a storage unit of the game console. The storage unit has an application program that is to access the file having a game identification code corresponding to the identification code in the small database, and load the file into a free space of a main memory of the game console. When a user select a game to play through a controller, a central processing unit (CPU) loads the file into the free space in the main memory and executes the file. As such, the game console's accessing the portable storage device is completed. On the other hand, when a user selects a game to play in the application program's menu through a controller, the CPU can directly load the file of the identification code, for example 01, into the free space in the main memory and execute the file. As such, the promptly mounting and localizing a game is completed.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

These and other objectives of the present invention will no doubt become obvious to those of ordinary skill in the art after reading the following detailed description of the preferred embodiment that is illustrated in the various figures and drawings.

DETAILED DESCRIPTION

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
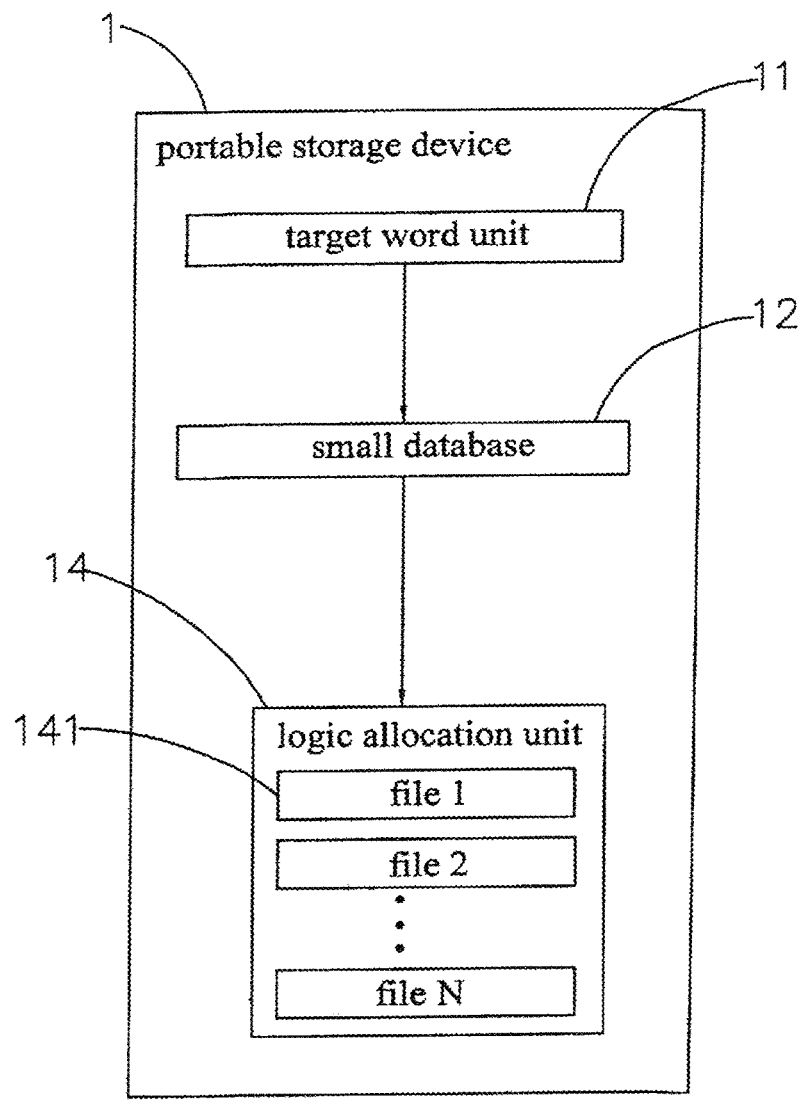
FIG. 1 is a block view of a portable storage device in accordance with the present invention.
Figure 2:
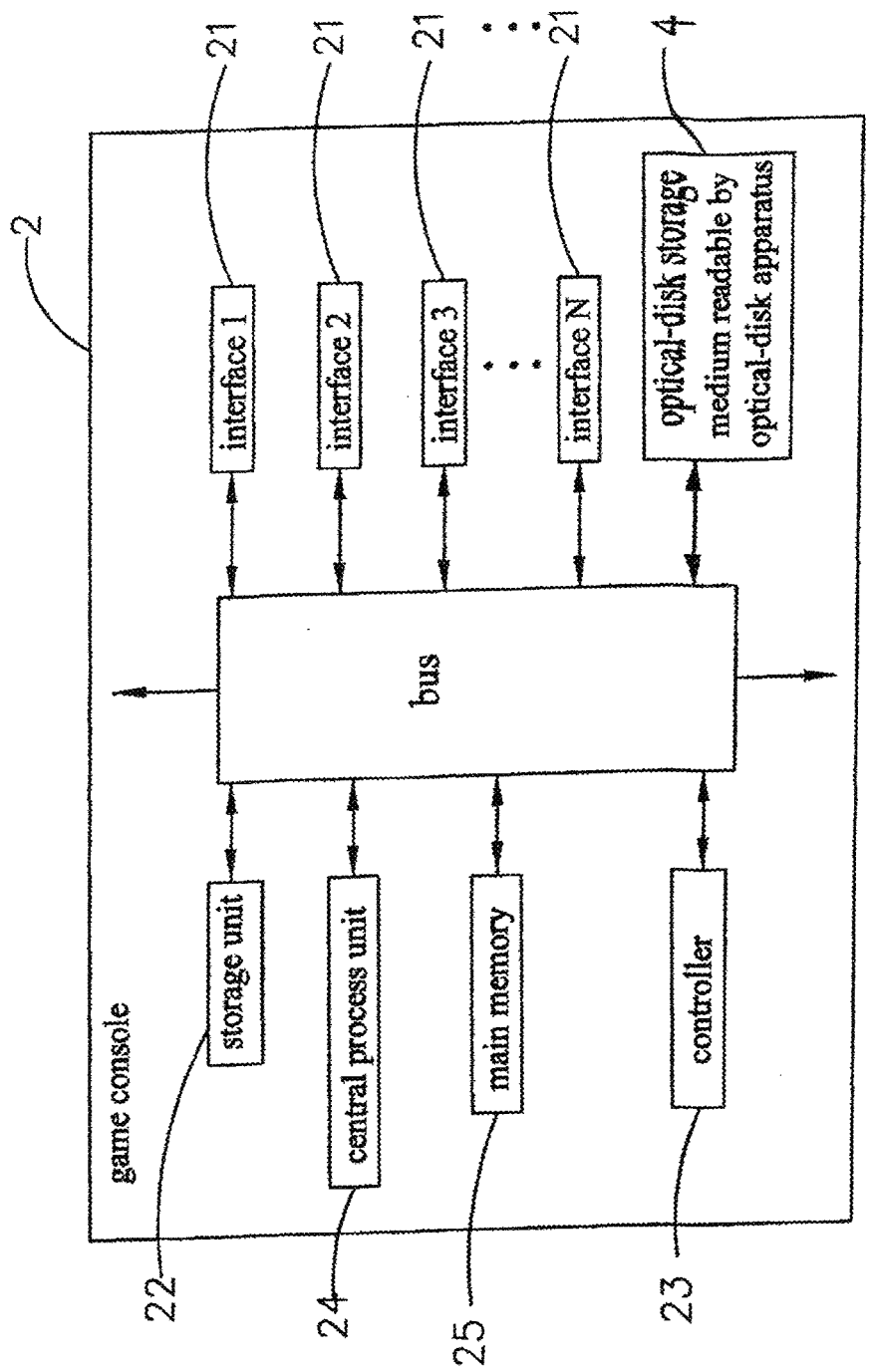
FIG. 2 is a block view of a game console in accordance with the present invention.
Figure 3:
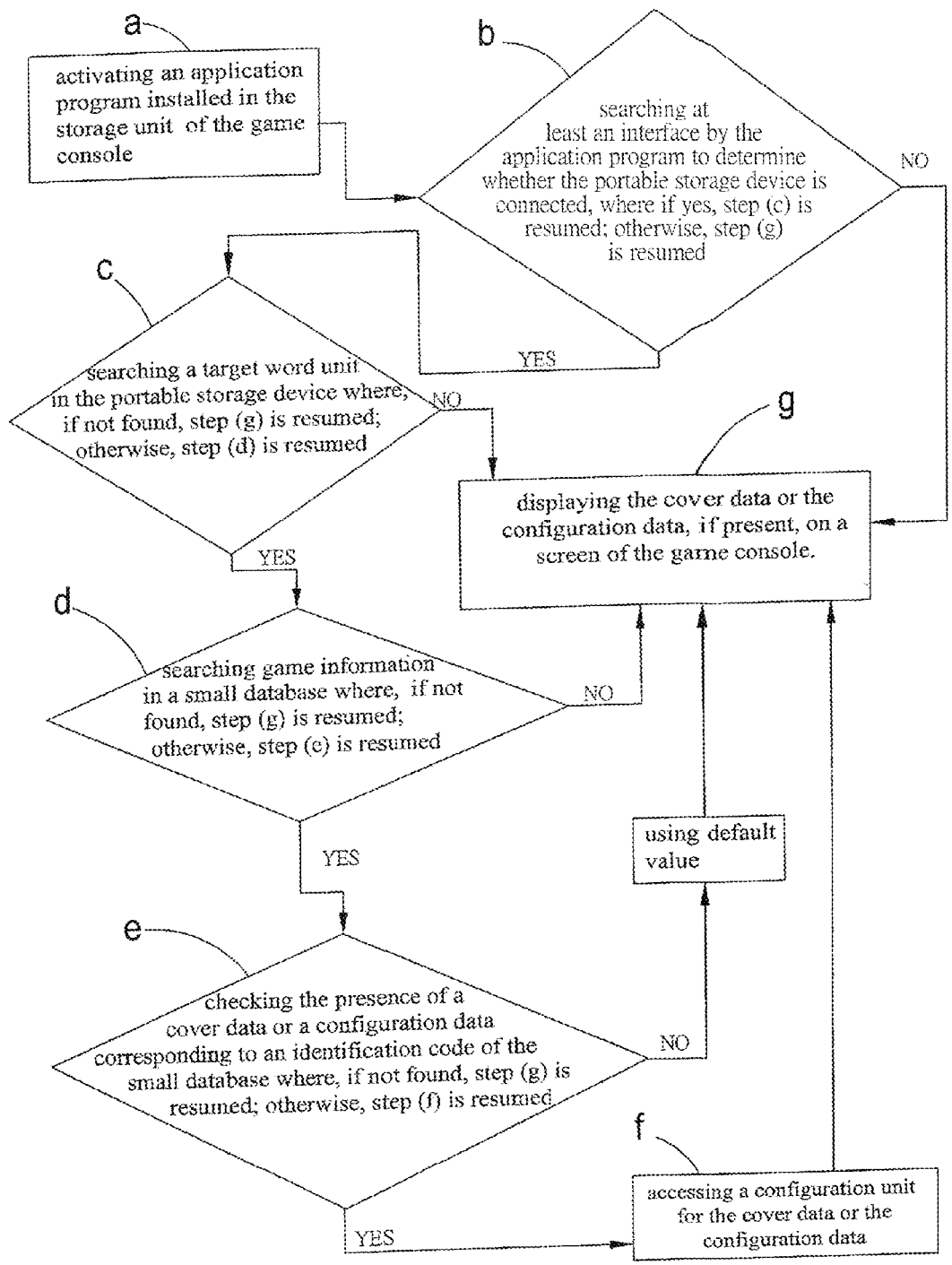
FIG. 3 is a flow chart of a method for the game console reading information of the portable storage device in accordance with the present invention.
Figure 3A:
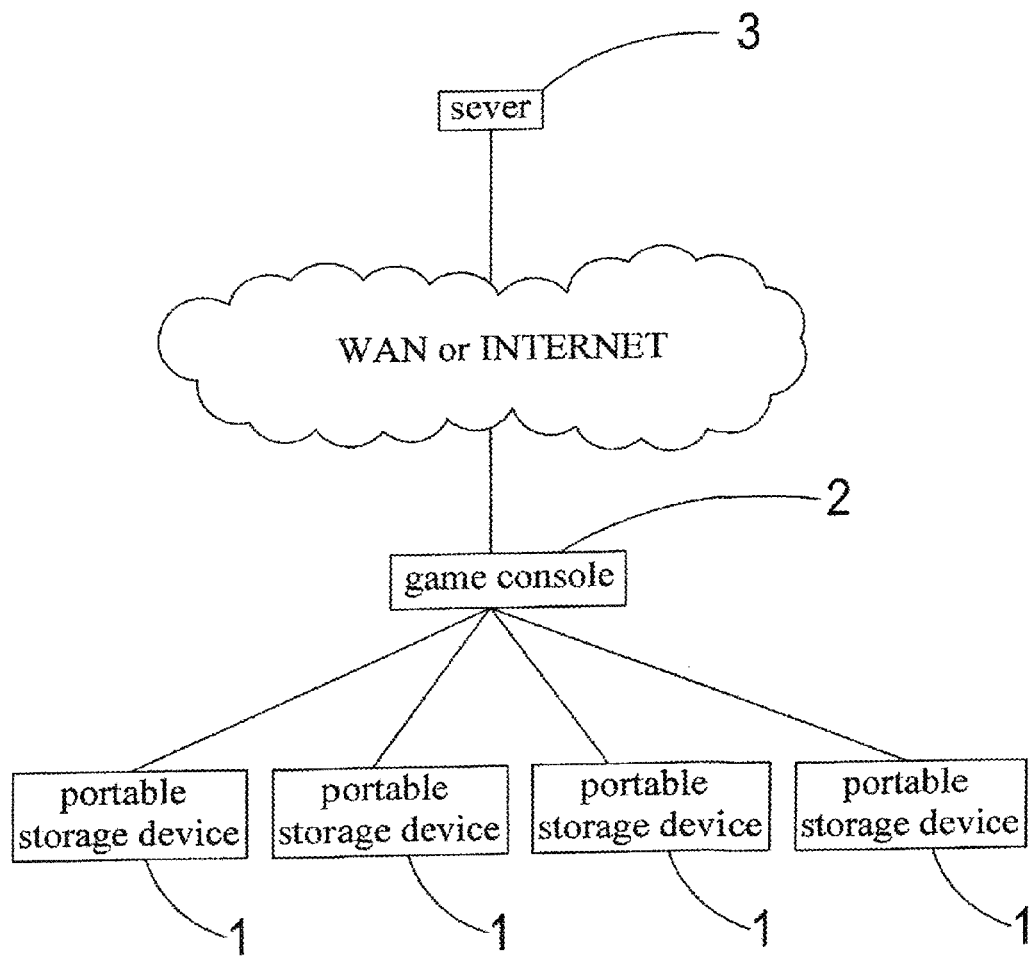
FIG. 3A is a schematic view in accordance with an embodiment of the present invention.
Figure 3B:
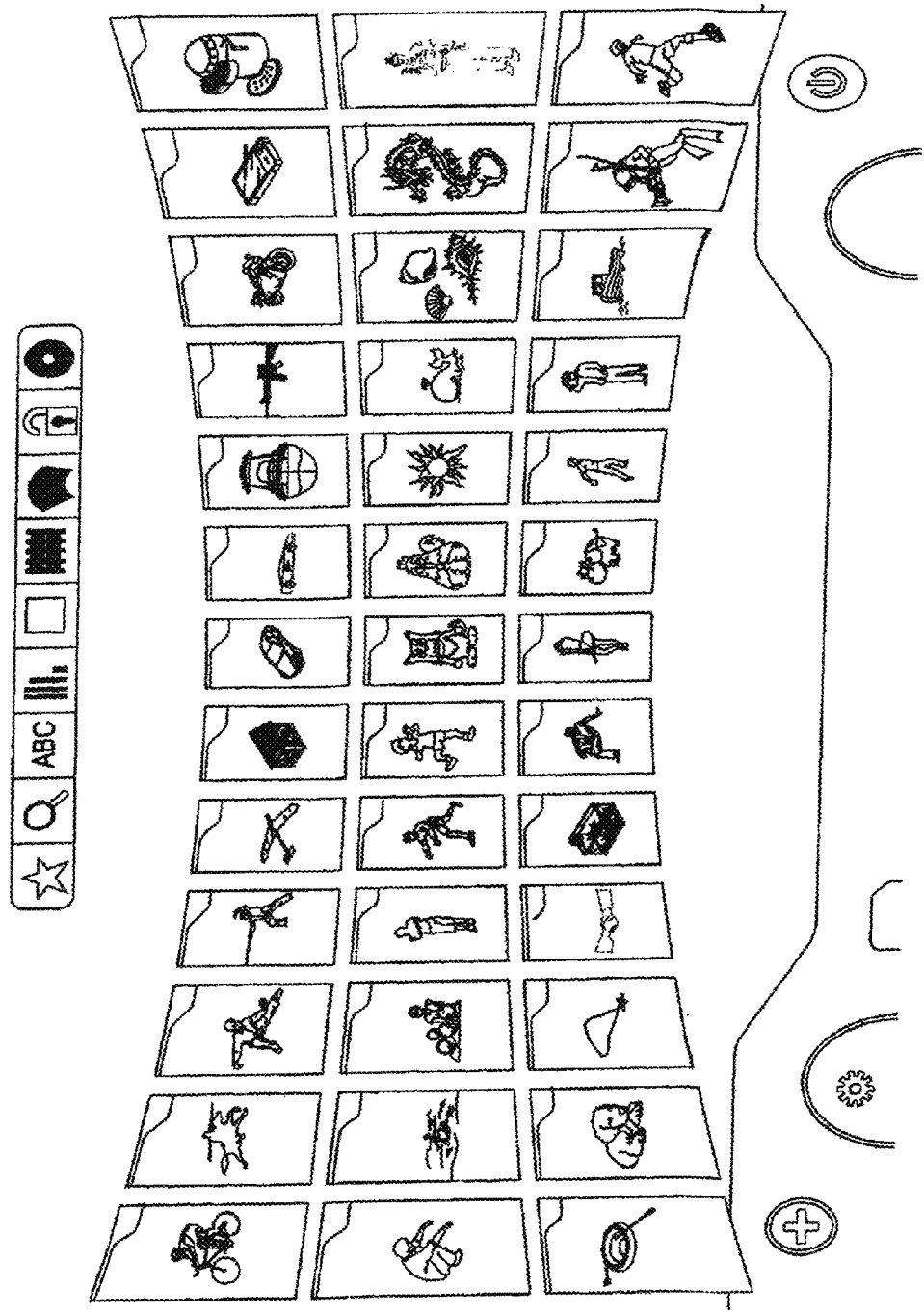
FIG. 3B is a schematic view of a menu of the game console's application program in accordance with the present invention.

As shown in FIGS. 1 and 2, a localization system according to an embodiment of the present invention contains a portable storage device 1 and a game console 2.

The portable storage device 1 can be a Multimedia Card (MMC), a Secure Digital (SD) card, a MINI card, a MD card, a FLASH memory, a hard disk, or a similar memory device capable of storing files. The portable storage device 1 contains a target word unit (i.e., target) 11 data-linked to a small database (i.e., header) 12 having an identification code. The small database 12 is data-linked to a configuration unit having a cover data, configuration data, etc. (not shown, and the cover data or configuration data can be directly encoded into the small database 12). The small database 12 can access a logic allocation unit 14 which contains at least a file 141. The file 141 has a game identification code corresponding to the identification code so that the small database 12 can precisely locate the file 141. The file 141 also has a game title, a game program, or game sound data, or game graphic data, etc.

The game console 2 can be a computer, a tablet computer, a smart phone, a XBOX, a XBOX 360, a Playstation2 (PS2), a Playstation3 (PS3), a Nintendo Wii, a Nintendo64 (N64), or a similar electronic appliance capable of interacting with user. The game console 2 contains at least an interface 21 for performing data transmission through WIFI, Bluetooth, USB, RS-454, IEEE1394, SATA, and Thunderbolt, Lighting, SD card socket (e.g., in a cellular phone), or any wired or wireless data transmission means. The interface 21 provides transmission functions such data downloading or overwriting existing files. The interface 21 is data-linked to a storage unit 22 which stores at least an application program. The application program is utilized to access the small database 12 and display the relevant information about the file 141 whose game identification code is corresponding to the identification code of the small database 12. When a user wants to select a game to play, the user makes the selection through a controller 23. A central process unit (CPU) 24 loads the file 141 into a free space in a main memory 25 of the game console 2, and executes the file 141. The interface 21 is able to data-link to at least a preset server 3, and the application program is able to compare the small database 12's game information with a game database in the server 3. Based on the comparison result, a new file is downloaded or overwrites the existing file 141.

Additionally, the game console 2 may contain at least an optional optical disk apparatus to access an optical-disk storage medium 4 and to download a file from the optical-disk storage medium 4 into the logic allocation unit 14 when a user selects and executes the installation of a game through the application program's menu. The cover data or configuration data in the optical-disk storage medium 4 is also downloaded into the configuration unit's respective blocks for the cover data or the configuration data. Relevant gaming information is also recorded in the small database 12 for increasing the speed of running a game.

As shown in FIGS. 1 to 3B, a process of accessing the portable storage device 1 by the game console 2 contains the following steps.

In step (a), an application program installed in the storage unit 22 of the game console 2 is activated.

In step (b), the application program searches the at least one interface 21 to determine whether the portable storage device 1 is connected. If yes, the process enters the step (c). Otherwise, the process enters the step (g).

In step (c), the target word unit 11 stored in the portable storage device 1 is searched. If the target word unit 11 is found, the process enters the step (d). Otherwise, the process enters the step (g).

In step (d), game information in the small database 12 is searched. If found, the process enters the step (e). Otherwise, the process enters the step (g).

In step (e), the presence of a cover data or a configuration data corresponding to the identification code of the small database 12 is checked. If yes, the process enters the step (f). Otherwise, the process enters the step (g).

In step (f), a configuration unit is accessed for the cover data or the configuration data.

In step (g), the cover data or the configuration data, if present, is displayed by the application program on a screen of the game console 2.

Figure 4:
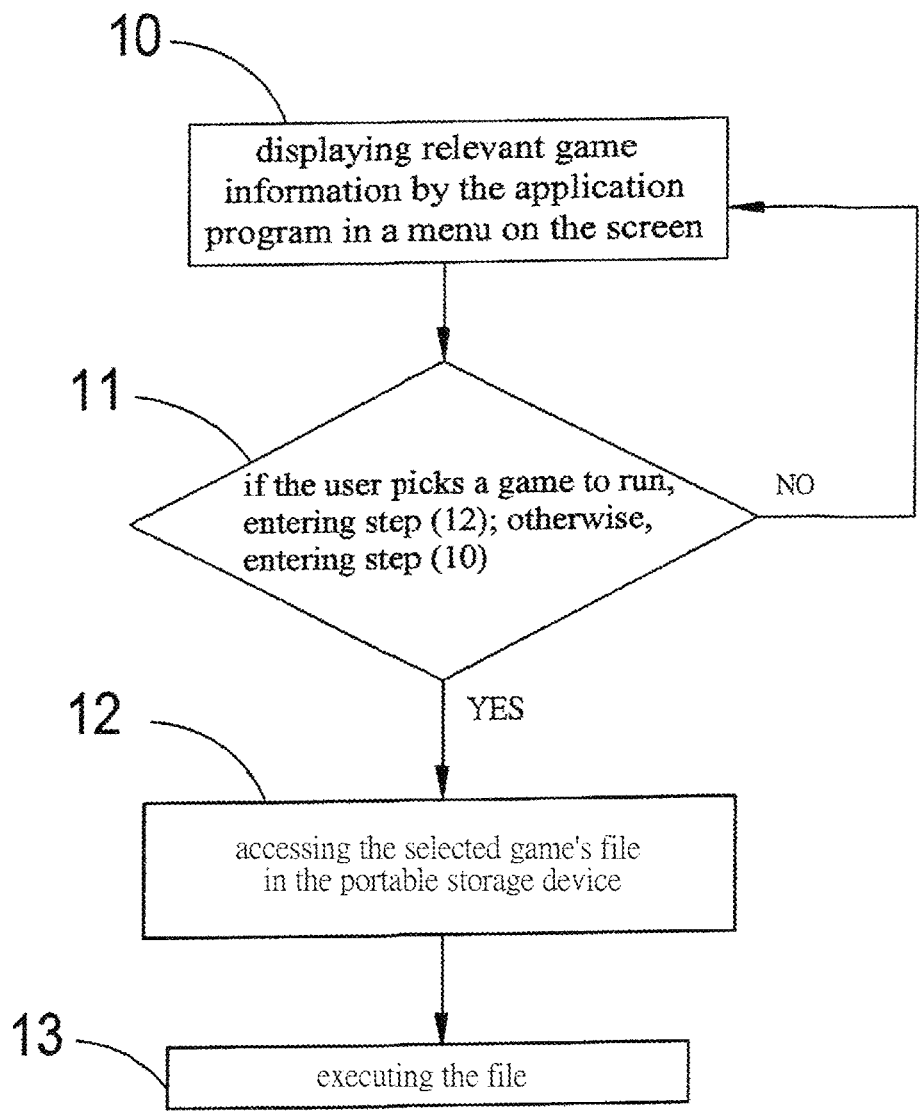
FIG. 4 is a block flow chart of running a game in accordance with the present invention.

As shown in FIG. 4, after the game console 2 obtains the cover data or the configuration data in the portable storage device 1, a user can pick and run a game from the screen. The process is as follows.

In step (10), the application program displays relevant game information in a menu on the screen.

In step (11), if the user picks a game to run, the process enters the step (12). Otherwise, the process returns to the step (10).

In step (12), the selected game's file 141 in the portable storage device 1 is accessed.

In step (13), the file 141 is executed.

Figure 5:
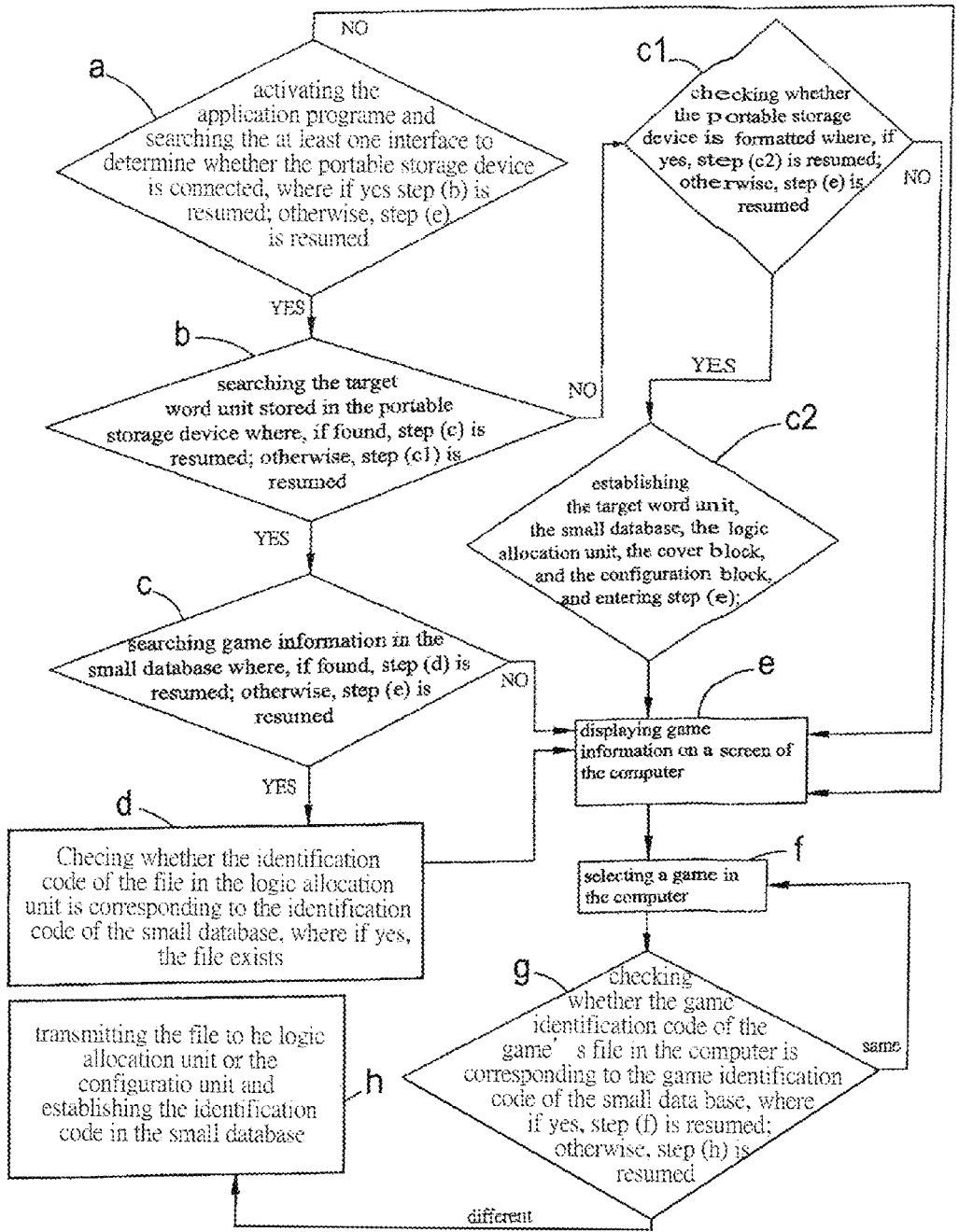
FIG. 5 is a flow chart of steps of a computer acting as the game console to transmit files in accordance with the present invention.

As shown in FIG. 5, a process of accessing the portable storage device 1 by the game console 2, which is a computer, contains the following steps.

In step (a), the application program is activated and the application program searches the at least one interface 21 to determine whether the portable storage device 1 is connected. If yes, the process enters the step (b). Otherwise, the process enters the step (e).

In step (b), the target word unit 11 stored in the portable storage device 1 is searched. If the target word unit 11 is found, the process enters the step (c). Otherwise, the process enters the step (c1).

In step (c1), whether the portable storage device 1 is formatted is checked. If yes, the process enters the step (c2). Otherwise, the process enters the step (e).

In step (c2), the target word unit 11, the small database 12, the logic allocation unit 14, the cover block, or configuration block are established. The process enters the step (e).

In step (c), game information in the small database 12 is searched. If found, the process enters the step (d); otherwise, the process enters the step (e).

In step (d), whether the game identification code of the file 141 in the logic allocation unit 14 is corresponding to the identification code of the small database 12 is checked. If yes, the file 141 exists.

In step (e), the application program displays relevant game information on a screen of the computer.

In step (f), a game in the computer is selected.

In step (g), whether the game identification code of the game's file 141 in the computer is corresponding to the identification code of the small database 12 is checked. If yes, the process returns to the step (f). Otherwise, the process enters the step (h).

In step (h), the file 141 is transmitted to the logic allocation unit 14 or the configuration unit. The identification code is established in the small database 12.

Figure 6:
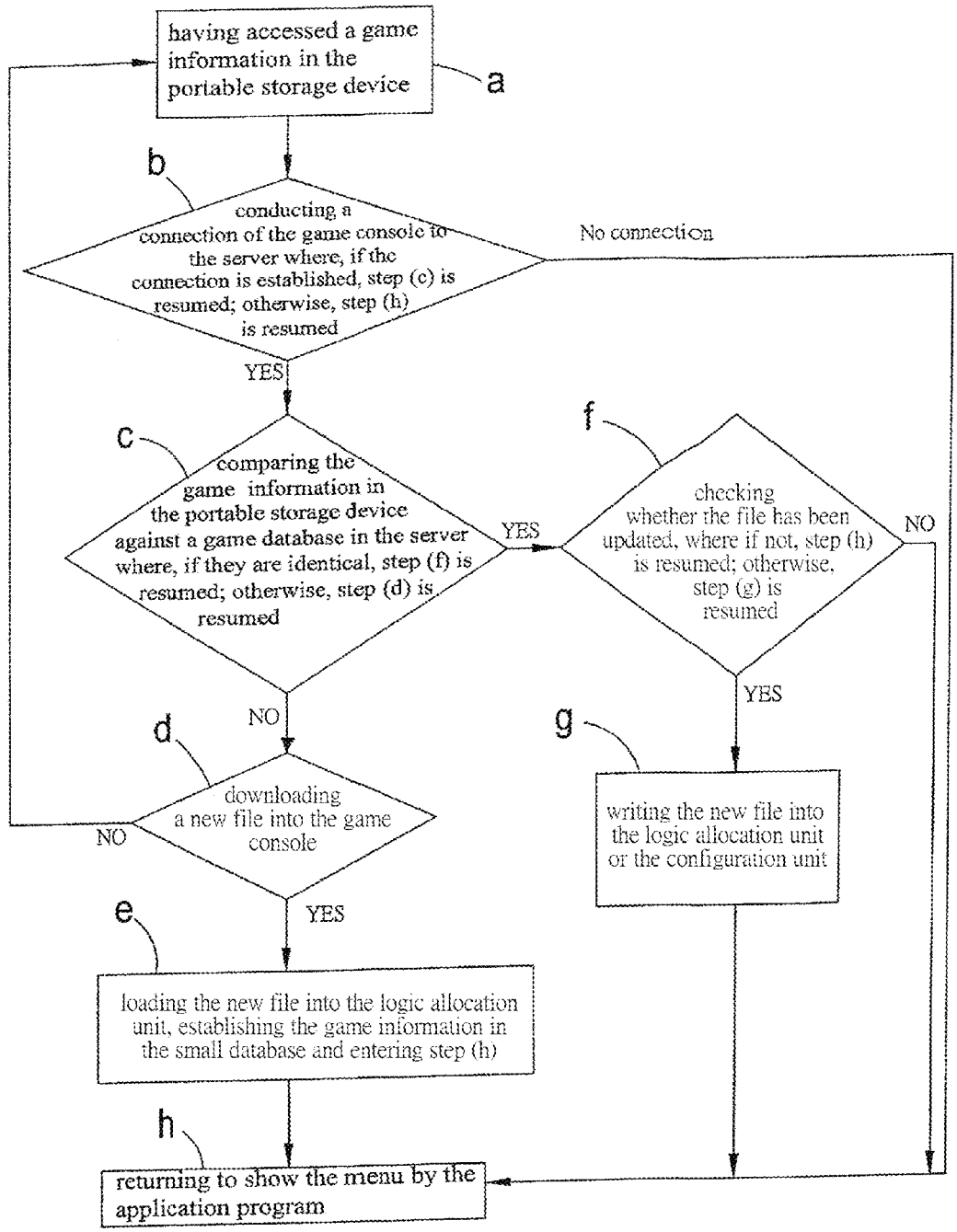
FIG. 6 is a flow chart of steps of downloading from a server by the game console connecting with the portable storage device in accordance with the present invention.

As shown in FIG. 6, after the portable storage device 1 is mounted onto (i.e., is connected to) the game console 2 and a selection from a menu displayed by the application program is made, the process of linking and downloading from the server contains the following steps:

In step (a), the application program has accessed the game information specified by the selection from the menu.

In step (b), a connection of the game console 2 to the server 3 is tried. If the connection is established, the process enters the step (c). Otherwise, the process enters the step (h).

In step (c), the game information in the portable storage device 1 is compared against a game database in the server 3. If they are identical, the process enters the step (d). Otherwise, the process enters the step (f).

In step (d), a file is downloaded into the game console 2.

In step (e), the file is downloaded into the logic allocation unit 14 of the portable storage device 1. The game information is established in the small database 12.

In step (f), whether the file has been updated is checked. If yes, the process enters the step (g). Otherwise, the process enters the step (h).

In step (g), the file is written into the logic allocation unit 14 or the configuration unit.

In step (h), the application program returns to show the menu.

Figure 7:
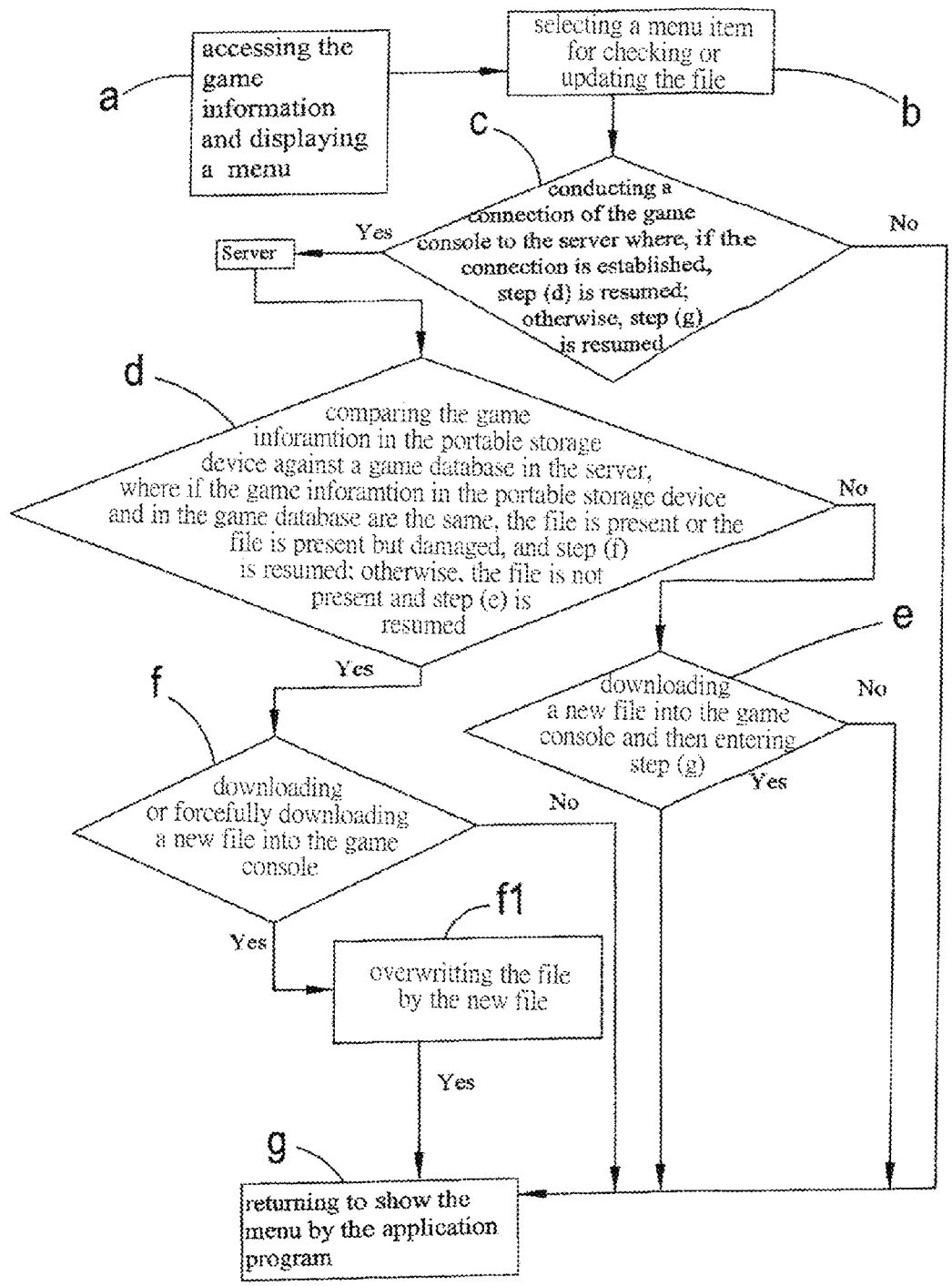
FIG. 7 is a flow chart of steps of verifying if a game can be normally operated or displayed and of connecting with at least a server to update the file in accordance with the present invention.

As shown in FIG. 7, after the portable storage device 1 is mounted onto the game console 2 and a selection from a menu displayed by the application program is made, the process of updating the file contains the following steps.

In step (a), the application program has accessed the game information specified by the selection from the menu, and a menu is displayed.

In step (b), a menu item for checking or updating file is selected.

In step (c), a connection of the game console 2 to the server 3 is tried. If the connection is established, the process enters the step (d). Otherwise, the process enters the step (g).

In step (d), the game information in the portable storage device 1 is compared against a game database in the server 3. If the game program is not present, the process enters the step (e). If game information in the server 3 and that in the game database are different, the file is not present and the process enters the step (e). If game information and the game database are the same, the file is present or the file is present but damaged, the process enters the step (f).

In step (e), the file is downloaded into the game console 2 from the server 3. The process enters the step (g).

In step (f), the file is downloaded or is forcefully downloaded into the game console 2. The process enters the step (f1).

In step (f1), the existing file is overwrote by the newly downloaded file.

In step (g), the application program returns to show the menu.

Figure 8:
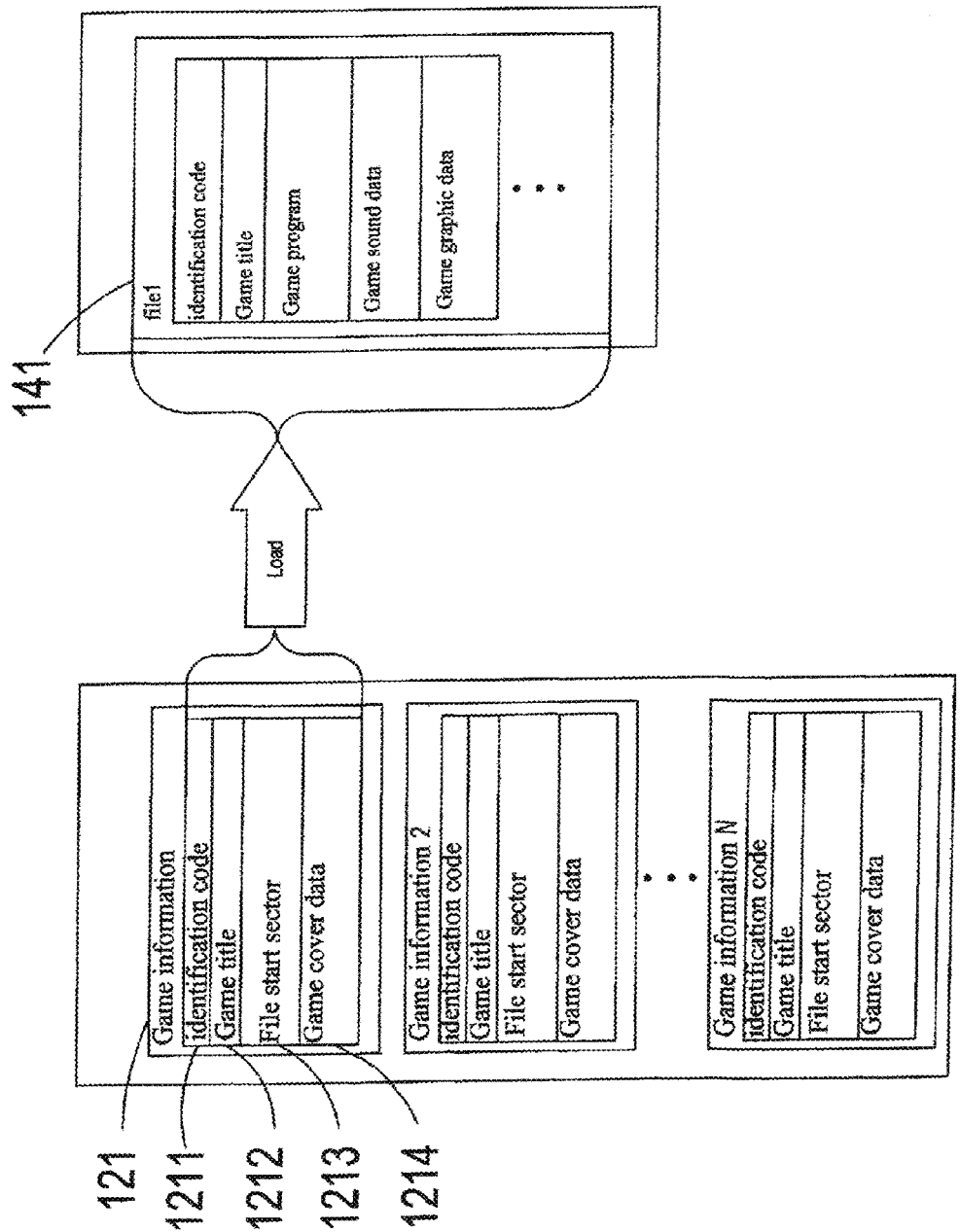
FIG. 8 is a layout of the main memory in accordance with the present invention.

As shown in FIG. 8, in the main memory 25 of the game console 2, there is at least a game information 121 which contains an identification code 1211, and may further contain a game title 1212, a file start section 1213 indicating a corresponding file's start location in the logic allocation unit 14, and a cover data 1214 for the game. When a user picks a game to play from the menu provided by the application program, a file 141 in the logic allocation unit 14 having a game identification code corresponding to the identification code 1211 of the game information 121 therefore can be quickly located, loaded into a free space in the main memory 25, and then executed. The file 141 also contains the game title, the game program, or the game sound data, or the game graphic data. For the other game information 121 that is not picked, they are ignored, thereby achieving the asynchronous localization.

Figure 9:
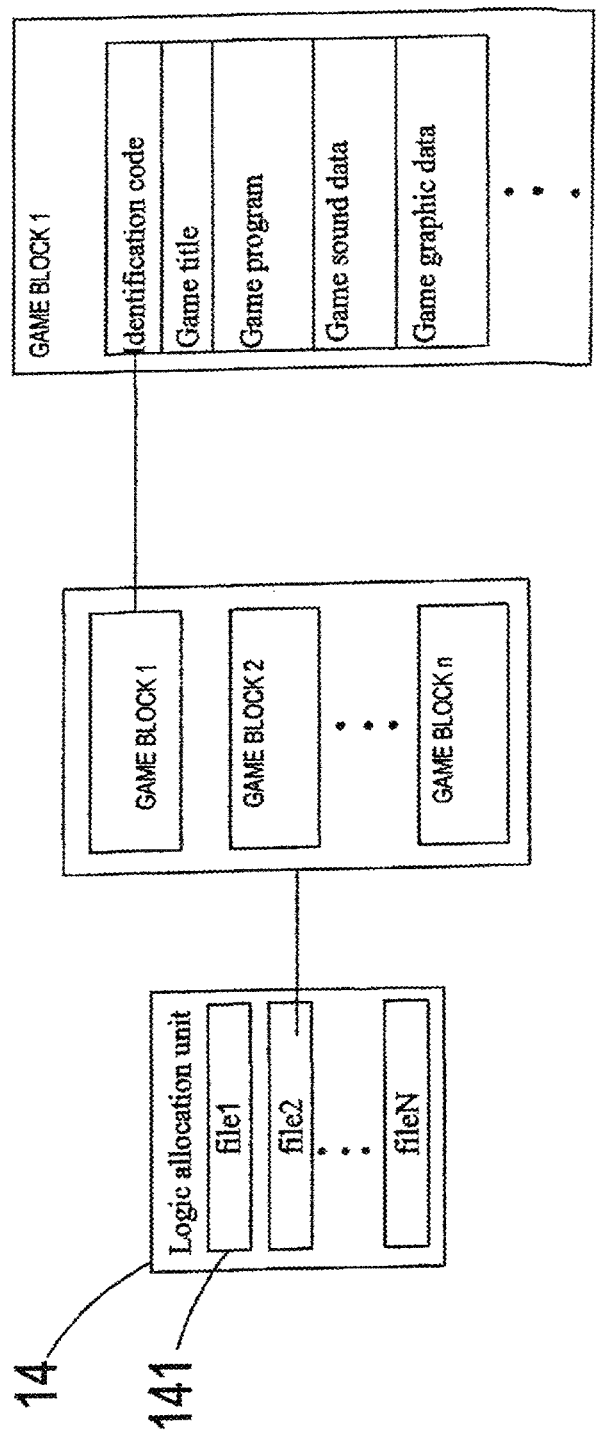
FIG. 9 is a first schematic structural view of expanding the file.
Figure 10:
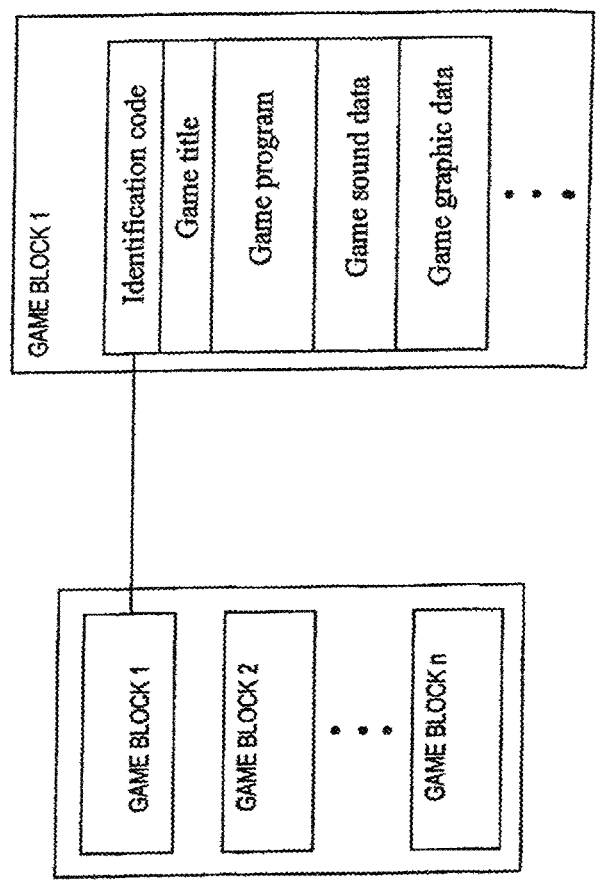
FIG. 10 is a second schematic structural view of expanding the file.

As shown in FIG. 9, if viewed from the perspective of the storage medium, there are multiple files 141 in the logic allocation unit 14. Each file 141 is packaged as a game block. When a file 141 is selected and unpacked, the game block contains a game identification code, a game title, a game program, or game sound data, or game graphic data. As shown in FIG. 10, if viewed from the perspective of the game console 2, there are multiple game blocks. Each game block contains a game identification code, a game title, a game program, or game sound data, or game graphic data. Please note that the file can be a compressed file or any package file. Additionally, a file of FIG. 9 is basically identical to a game block of FIG. 10 as the difference only lies in the perspective. Therefore, accessing a file can be deemed as accessing game block.

Figure 11:
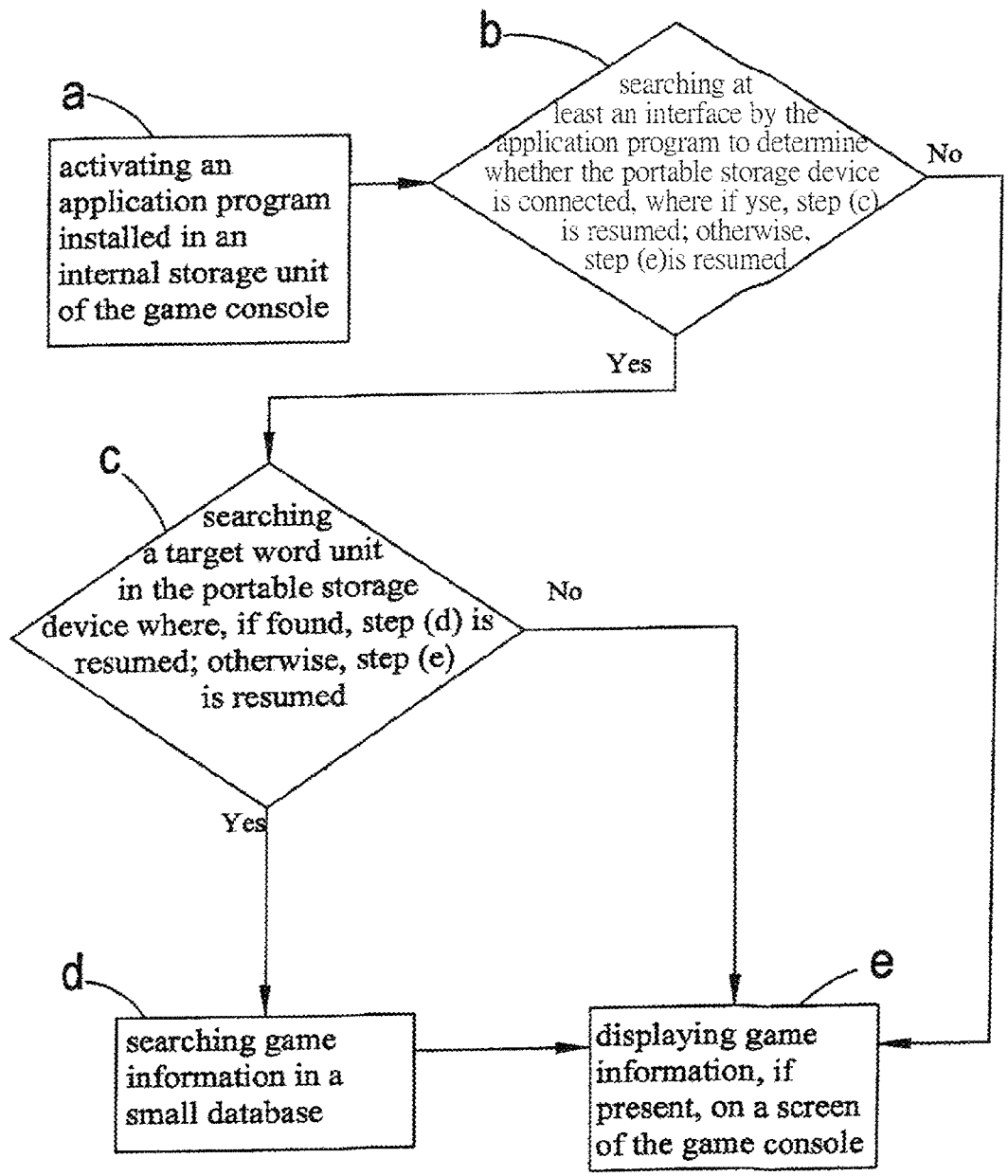
FIG. 11 is another flow chart of a method for the game console reading information of the portable storage device in accordance with the present invention.

As shown in FIG. 11, the localization method contains the following steps.

In step (a), an application program installed in an internal storage unit 22 of a game console 2 is activated.

In step (b), the application program searches through at least an interface 21 to determine whether a portable storage device 1 is connected. If yes, the process enters the step (c). Otherwise, the process enters the step (e).

In step (c), a target word unit 11 in the portable storage device 1 is searched. If not found, the process enters the step (e). Otherwise, the process enters the step (d).

In step (d), game information in a small database 12 of the portable storage device 1 is searched.

In step (e), the game information is returned to the application program and is displayed in a menu of the application program.

Figure 12:
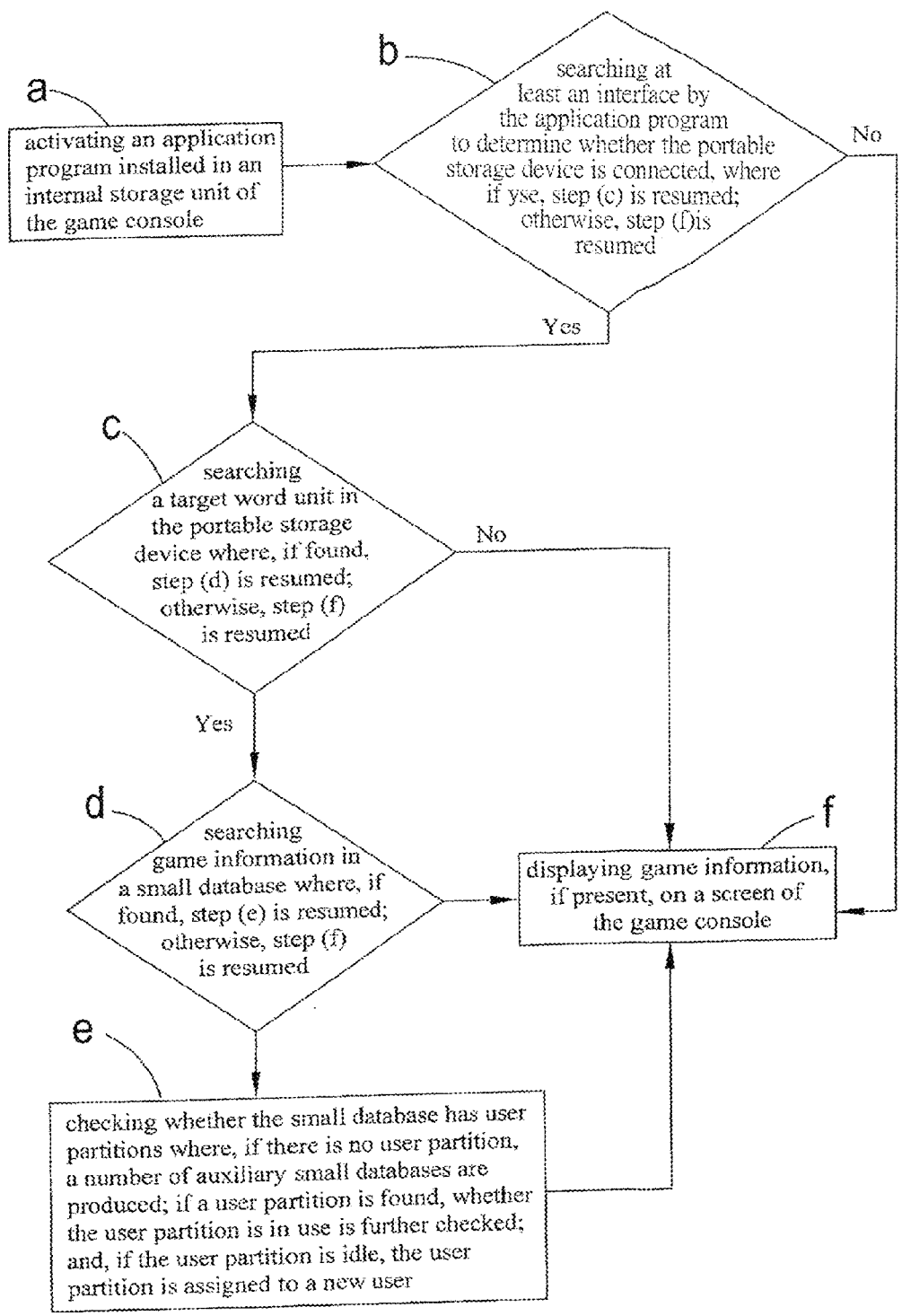
FIG. 12 is yet another flow chart of a method for the game console reading information of the portable storage device in accordance with the present invention.
Figure 13:
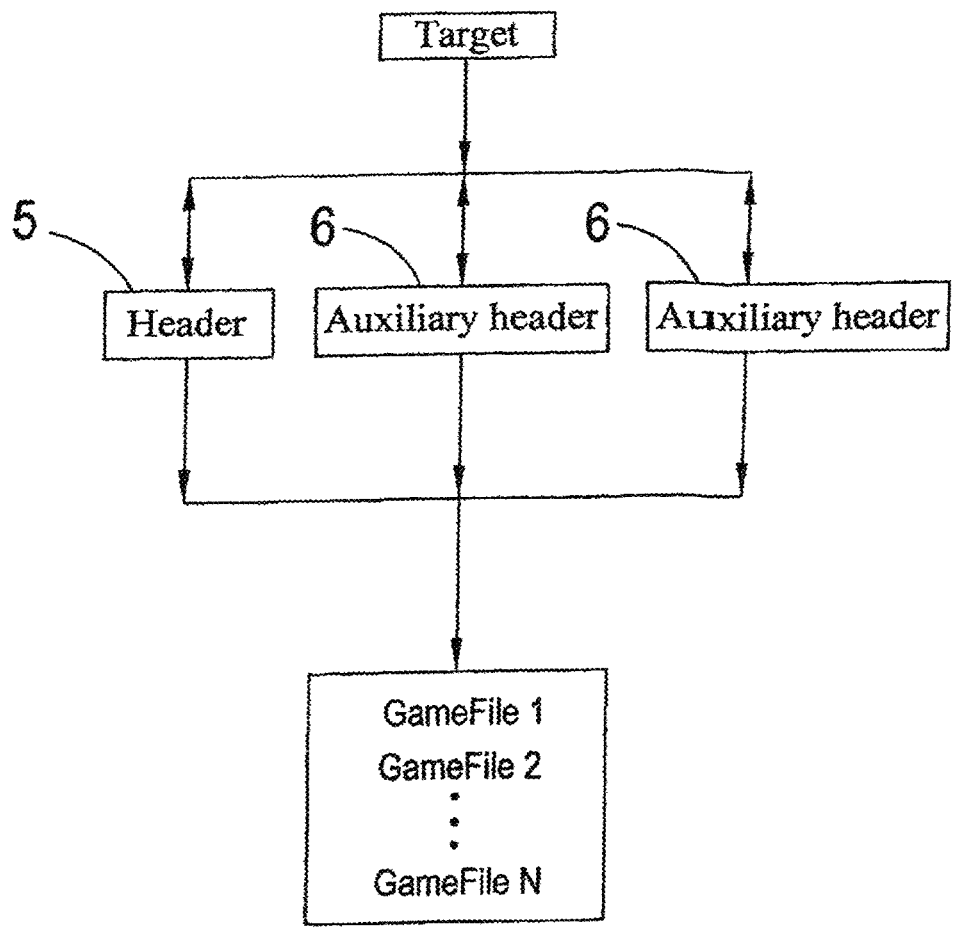
FIG. 13 is a schematic structural view showing small database and auxiliary databases of the present invention.
Figure 14:
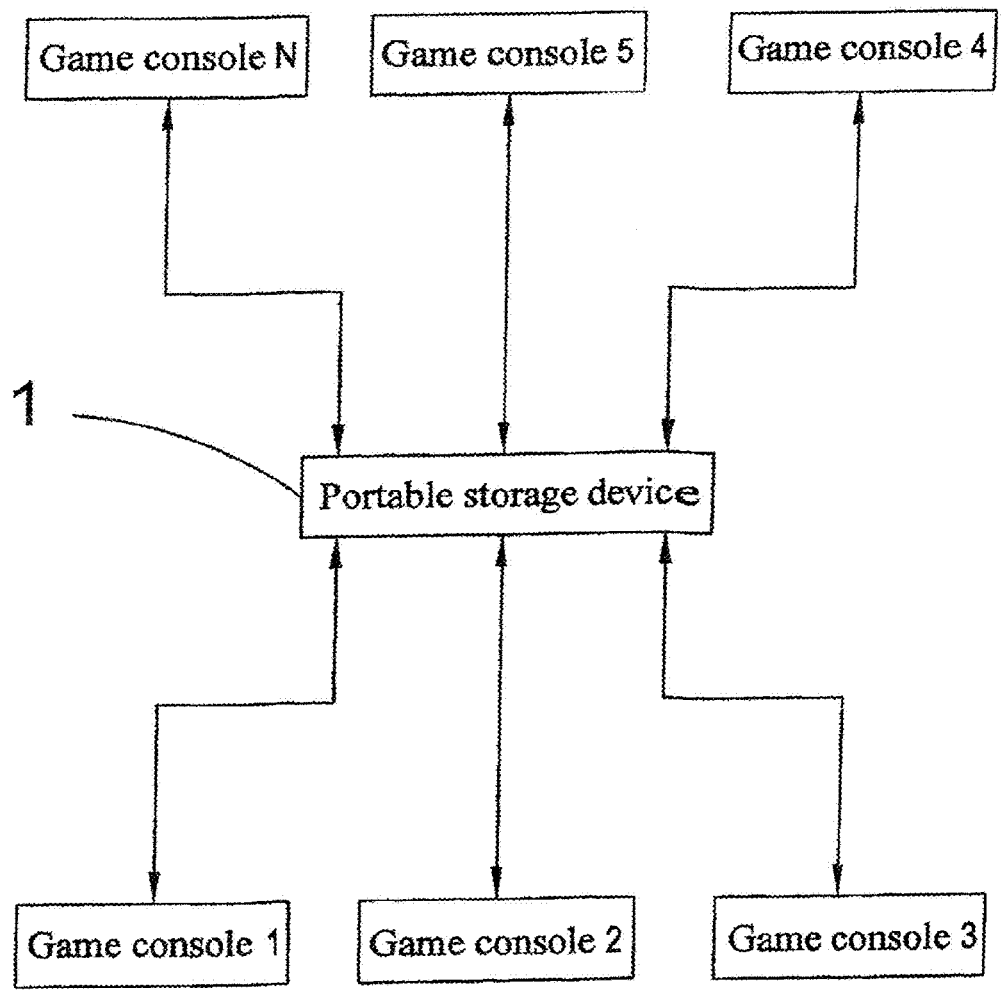
FIG. 14 is a schematic structural view of multiple game consoles sharing a single portable storage device of the present invention.

As shown in FIGS. 12 to 14, another embodiment of the localization method contains the following steps.

In step (a), an application program installed in an internal storage unit of a game console is activated.

In step (b), the application program searches through at least an interface to determine whether a portable storage device is connected. If yes, the process enters the step (c). Otherwise, the process enters the step (f).

In step (c), a target word unit in the portable storage device is searched. If not found, the process enters the step (f). Otherwise, the process enters the step (d).

In step (d), game information in a small database (i.e., header) of the portable storage device is searched. If the game information is found, the process enters the step (e). Otherwise, the process enters the step (f).

In step (e), whether the small database has user partitions is checked. If there is no user partition, a number of auxiliary small databases are produced. If a user partition is found, whether the user partition is in use is further checked. If the user partition is idle, the user partition is assigned to a new user.

In step (f), the game information is returned to the application program and is displayed in a menu of the application program.

Different from the previous embodiment, the present embodiment provides many-to-one or one-to-many scenarios. When a first user logs in, the small database 5 automatically updates the data in the auxiliary small databases 6, and uses the first auxiliary small database 6. Subsequently, when a second user logs in, a second auxiliary small database 6 can be used. As such, the first and second users do not have data conflict when they conduct their game playing. In other words, each user has his/her own small databases. If a third user logs in, then a third auxiliary small database 6 can be used, and so on. In this way, when multiple users log in for playing games, each user has proprietary small database 5 or auxiliary small database 6 for game-related operations, thereby avoiding data conflict from using a same small database. Subsequently, when the small database 5 is updated, the auxiliary small databases 6 can be updated synchronously so that each user is able to access the latest game menu.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A localization system for mounting a game, comprising:
   at least a portable storage device, wherein each of the portable storage device comprising:
      a target word unit, linked to a small database having an identification code, wherein the small database accesses a logic allocation unit comprising at least one file and the each of the at least one file comprises a file identification code; and
   a game console, comprising:
      at least an interface, linked to a storage unit storing at least an application program for linking the portable storage device and for downloading or overwriting the data; and
      a central process unit (CPU);
   wherein the application program is utilized to access the small database and display relevant information about the file having the file identification code corresponding to the identification code of the small database;
   wherein the CPU loads cover data or configuration data into a free space in a storage unit of the game console and displays the cover data or the configuration data to show a menu.

2. The localization system according to claim 1, wherein the at least one interface links with a preset server for downloading or for downloading or overwriting an existing file.

3. The localization system according to claim 1, wherein the small database is linked to a configuration unit; and the configuration comprises a cover block or a configuration block.

4. The localization system according to claim 1, wherein the file comprises a game identification code, a game title, a game program, or game sound data, or game graphic data.

5. The localization system according to claim 1, wherein the game console is a computer, a tablet computer, a smart phone, a XBOX, a XBOX360, a PS2, a PS3, a Wii, a N64, or a similar electronic appliance capable of user interaction; the portable storage device is a MMC card, a SD card, a MINI card, a MD card, a FLASH memory, a hard disk, or a similar memory device capable of storing files; and the interface provides Bluetooth, USB, RS-454, IEEE1394, SATA, Thunderbolt, Lighting, SD card socket, or any data transmission means.

6. The localization system according to claim 1, wherein the game console further comprises at least an optical disk apparatus to access an optical disk storage medium and to download files from the optical-disk storage medium into the logic allocation unit.

7. The localization system according to claim 3, wherein the steps of linking and downloading from the server comprises:
   (a) having accessed a game information in the portable storage device by the application program;
   (b) conducting a connection of the game console to the server;
   (c) comparing the game information in the portable storage device against a game database in the server;
   (f) checking whether the file has been updated;
   (g) writing the new file into the logic allocation unit or the configuration unit; and
   (h) returning to show the menu by the application program.

8. The localization system according to claim 1, wherein, after the portable storage device is mounted onto the game console and a selection from a menu displayed by the application program is made, the steps of updating the file comprises the steps of
   (a) accessing the game information specified by the selection from the menu and displaying a menu by the application program;
   (b) selecting a menu item for checking or updating the file;
   (c) conducting a connection of the game console to the server;
   (d) comparing the game information in the portable storage device against a game database in the server where, if identical, the file is present or the file is present but damaged, and step (f) is resumed;
   (e) downloading a new file into the game console and then entering step (g);
   (f) downloading or forcefully downloading a new file into the game console;
   (f1) overwriting the file by the new file; and
   (g) returning to show the menu by the application program.

9. The localization system according to claim 7, further comprising:
   (d) downloading a new file into the game console when the game information and the game database in the server are not identical; and
   (e) downloading the new file into the logic allocation unit or into the cover block or configuration block of the configuration unit, establishing the game information in the small database, and entering step (h).

10. The localization system according to claim 1, wherein a user picks and runs a game from a screen of the game console.

11. A game console for accessing a portable storage device, wherein the steps of the game console accessing the portable storage device comprises:

(a) activating the application program and searching the at least one interface to determine whether the portable storage device is connected;
(b) searching the target word unit stored in the portable storage device where, if found, step (c) is resumed;
(c) searching game information in the small database;
(d) checking whether the file identification code of the at least one file in the logic allocation unit is corresponding to the identification code of the small database where, if yes, the at least one file is present;
(e) displaying game information on a screen of the computer;
(f) selecting a game in the computer;
(g) checking whether the file identification code of the game's file in the computer is corresponding to the identification code of the small database where, if yes, step (f) is resumed; and
(h) transmitting the file to the logic allocation unit or the configuration unit, and establishing the identification code in the small database.

12. The game console according to claim 11, further comprising:
(c1) checking whether the portable storage device is formatted when the target word unit is not found in the portable storage device where, if not, step (e) is resumed; and
(c2) establishing the target word unit, the small database, the logic allocation unit, the cover block, or the configuration block, and entering step (e).

13. A localization method for mounting a game from a portable storage device onto a game console, comprising the steps of:
(a) activating an application program installed in an internal storage unit of the game console;
(b) searching at least an interface by the application program to determine whether the portable storage device is connected;
(c) searching a target word unit in the portable storage device;
(d) searching game information in a small database where;
(e) checking whether the small database has user partitions where, if there is no user partition, a plurality of auxiliary small databases are produced; if a user partition is found, whether the user partition is in use is further checked; and, if the user partition is idle, the user partition is assigned to a new user; and
(f) displaying game information, if present, on a screen of the game console.

14. A localization method for mounting a game from a portable storage device onto a game console, comprising the steps of:
(a) activating an application program installed in an internal storage unit of the game console;
(b) searching at least an interface by the application program to determine whether the portable storage device is connected;
(c) searching a target word unit in the portable storage device;
(d) searching game information in a small database is searched;
(e) checking the presence of a cover data or a configuration data corresponding to an identification code of the small database;
(f) accessing a configuration unit for the cover data or the configuration data having a same identification code;
(g) displaying the cover data or the configuration data, if present, on a screen of the game console;
(h) having accessed the game information in the portable storage device by the application program;
(i) conducting a connection of the game console to a server;
(j) comparing the game information in the portable storage device against a game database in the server;
(k) checking whether the file has been updated;
(l) writing the new file into the logic allocation unit or the configuration unit; and
(m) returning to show the menu by the application program.

15. The localization method according to claim 14, further comprising:
(n) downloading a new file into the game console when the game information and the game database in the server are not identical; and
(o) downloading the new file into the logic allocation unit or into the cover block or configuration block of the configuration unit, establishing the game information in the small database, and entering step (m).

16. A localization method for mounting a game from a portable storage device onto a game console, comprising the steps of:
(a) activating an application program installed in an internal storage unit of the game console;
(b) searching at least an interface by the application program to see if the portable storage device is connected;
(c) searching a target word unit in the portable storage device;
(d) searching game information in a small database;
(e) displaying game information, if present, on a screen of the game console;
(f) having accessed the game information in the portable storage device by the application program;
(g) conducting a connection of the game console to a server;
(h) comparing the game information in the portable storage device against a game database in the server;
(i) checking whether the file has been updated;
(j) writing the new file into the logic allocation unit or the configuration unit; and
(k) returning to show the menu by the application program.

17. The localization method according to claim 16, further comprising:
(l) downloading a new file into the game console when the game information and the game database in the server are not identical; and
(m) downloading the new file into the logic allocation unit or into the cover block or configuration block of the configuration unit, establishing the game information in the small database, and entering step (k).

* * * * *